No. 695,391. Patented Mar. 11, 1902.
F. C. HARWOOD, G. E. GEDGE & P. T. J. MONSON.
CORN PLANTER.
(Application filed Apr. 23, 1900.)
(No Model.) 4 Sheets—Sheet 1.
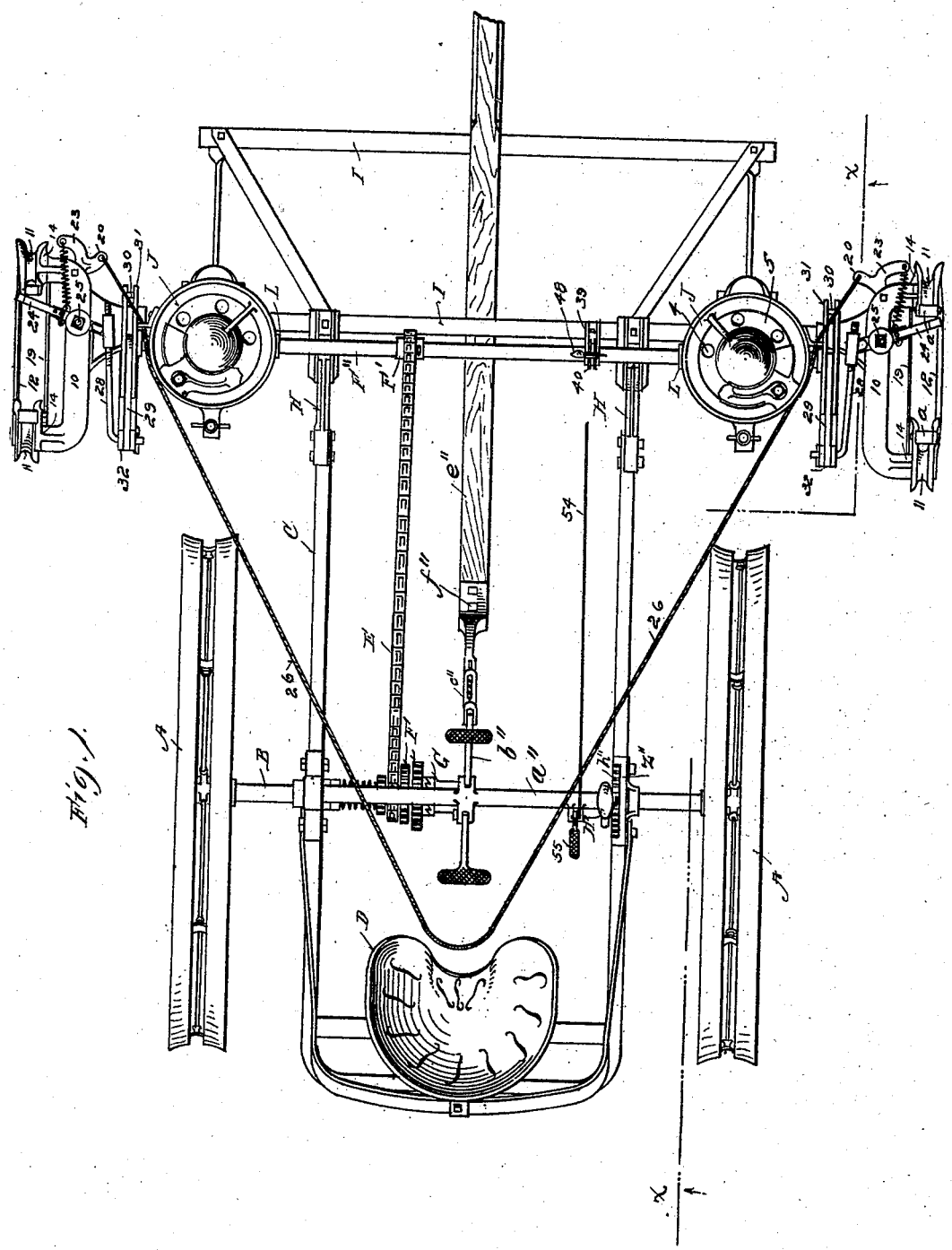

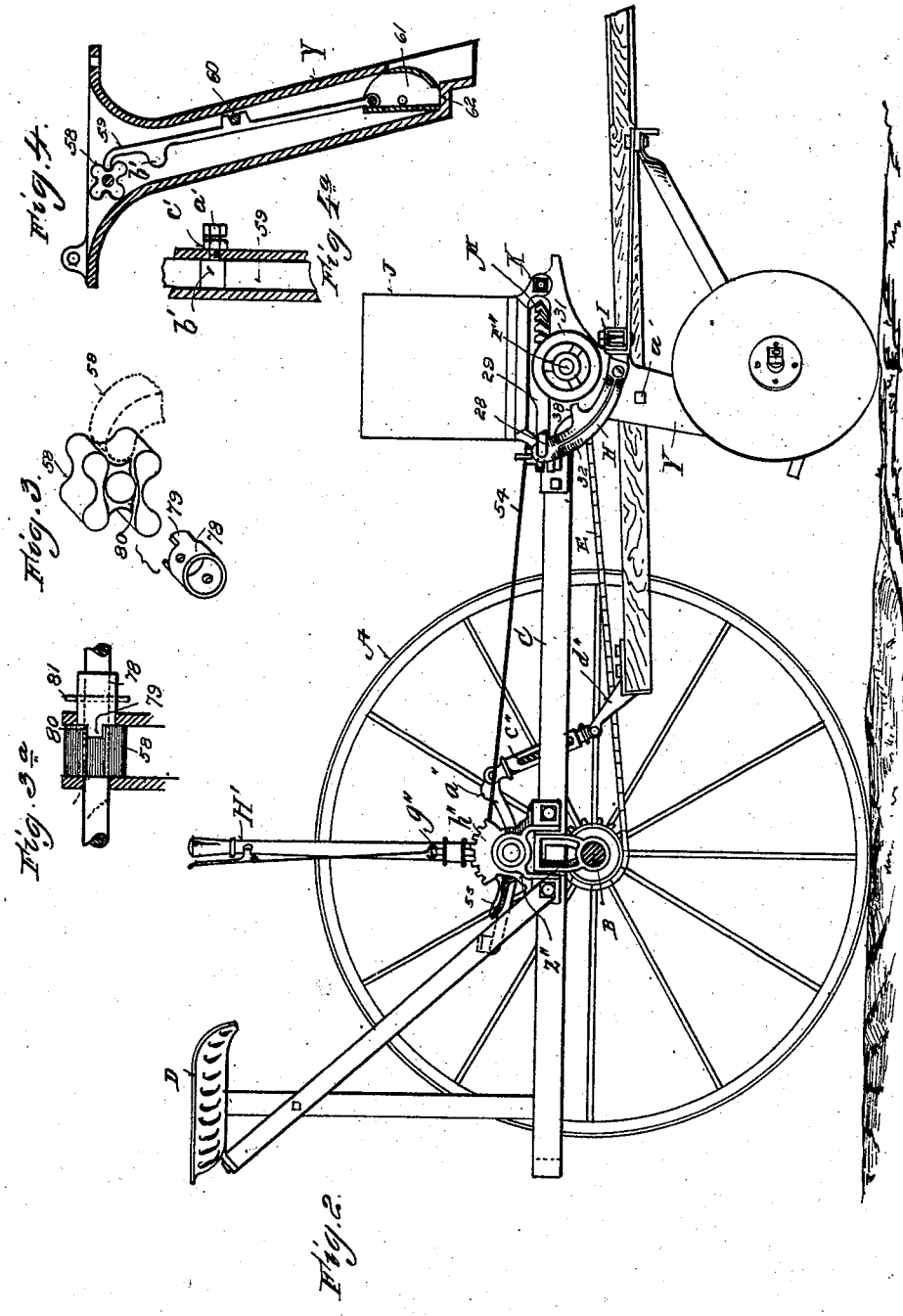

No. 695,391. Patented Mar. 11, 1902.
F. C. HARWOOD, G. E. GEDGE & P. T. J. MONSON.
CORN PLANTER.
(Application filed Apr. 23, 1900.)
(No Model.) 4 Sheets—Sheet 3.
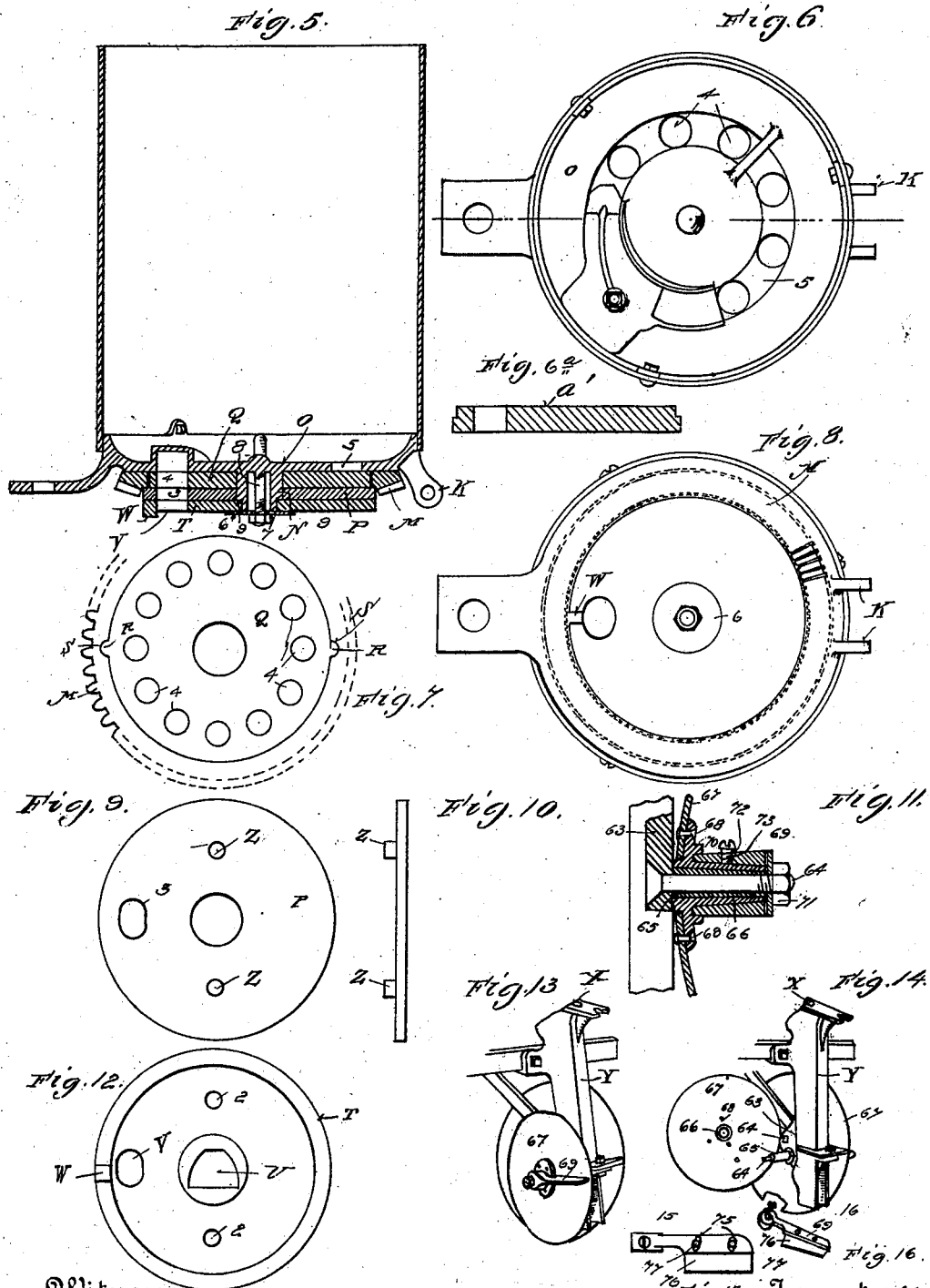
Witnesses
J. C. Dawley.
W. M. McNair.
Inventors
FRANK C. HARWOOD,
GEORGE E. GEDGE,
PHILIP T. J. MONSON.
By their Attorney
H. A. Toulmin.

No. 695,391. Patented Mar. 11, 1902.
F. C. HARWOOD, G. E. GEDGE & P. T. J. MONSON.
CORN PLANTER.
(Application filed Apr. 23, 1900.)
(No Model.) 4 Sheets—Sheet 4.
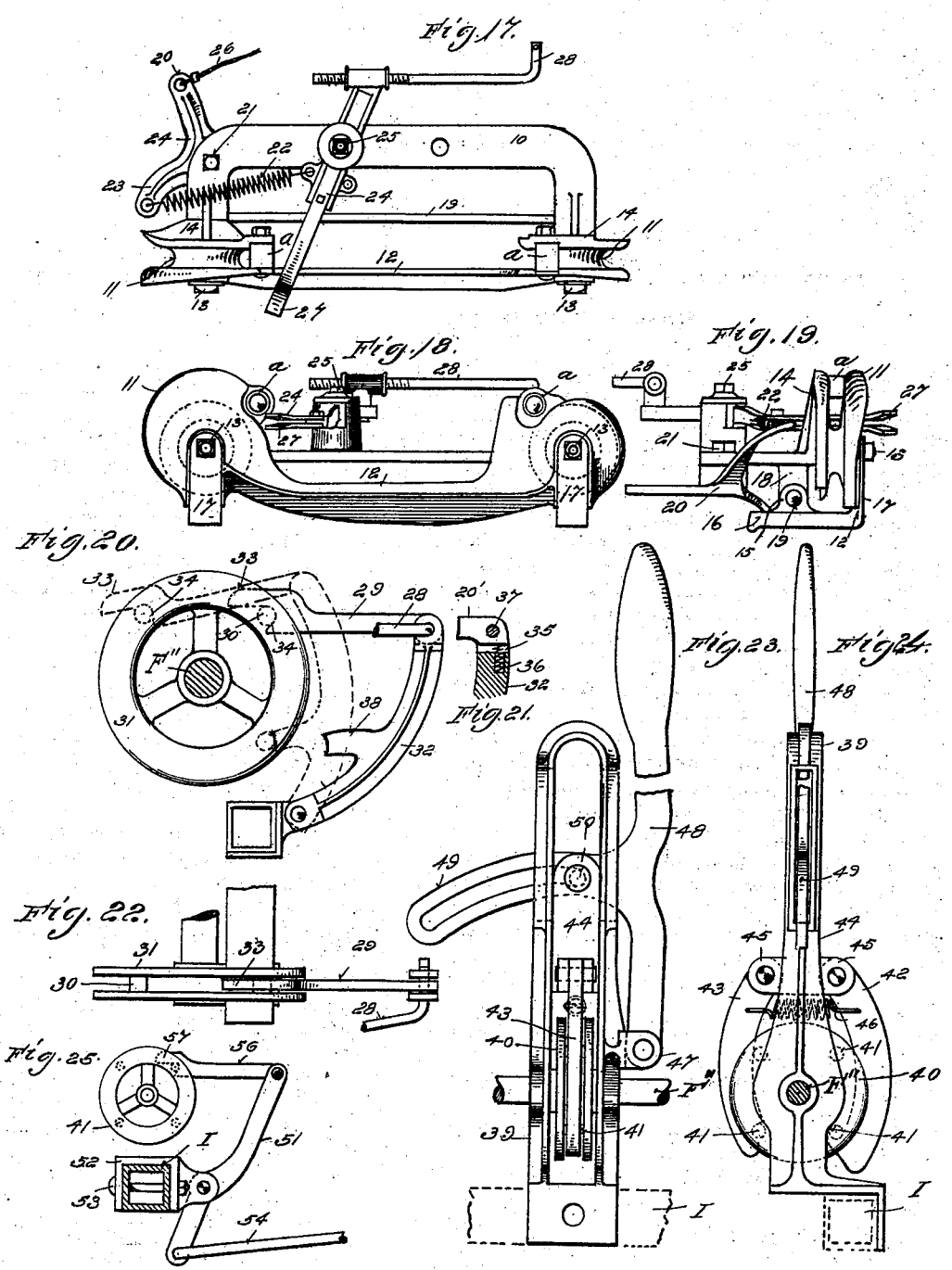
Witnesses
J. C. Dawley
W. M. McNair
Inventors
FRANK C. HARWOOD,
GEORGE E. GEDGE,
PHILIP T. J. MONSON.
By their Attorney
H. A. Toulmin

UNITED STATES PATENT OFFICE.

FRANK C. HARWOOD, GEORGE E. GEDGE, AND PHILIP T. J. MONSON, OF SPRINGFIELD, OHIO, ASSIGNORS TO THE A. C. EVANS MANUFACTURING COMPANY, OF SPRINGFIELD, OHIO, A CORPORATION OF OHIO.

CORN-PLANTER.

SPECIFICATION forming part of Letters Patent No. 695,391, dated March 11, 1902.

Application filed April 23, 1900. Serial No. 13,892. (No model.)

*To all whom it may concern:*

Be it known that we, FRANK C. HARWOOD, GEORGE E. GEDGE, and PHILIP T. J. MONSON, citizens of the United States, residing at Springfield, in the county of Clark and State of Ohio, have invented certain new and useful Improvements in Corn-Planters, of which the following is a specification, reference being had therein to the accompanying drawings.

This invention relates to certain new and useful improvements in corn-planters.

The general objects of our invention have reference, first, to an improved construction for releasing the check-row wire, so that it may be readily disengaged from the dropper mechanism; second, to provide an improved dropper-plate construction, whereby the dropper-plate may be quickly changed, so that the machine will plant in hills or sow in drills, according to which thickness of dropper-plate may be used; third, to an improved bearing construction for the furrow-opening disks which will not fill with soil and yet at the same time one which will permit the furrow-disks to easily rotate; fourth, to provide an improved scraper device for keeping each of the furrowing-disks clean; fifth, to provide an improved device for intermittently rocking the dropper-shaft; sixth, to provide an improved arrangement for rocking the valve in the delivery-boot.

Our invention also relates to details of construction and arrangement hereinafter appearing, and particularly pointed out in the claims.

In the accompanying drawings, on which like reference-letters indicate corresponding parts, Figure 1 is a plan view of a corn-planter, showing our improvements applied thereto; Fig. 2, a side elevation of the same; Fig. 3, a detail view of the device for operating the boot-valve and showing the device for connecting such operating device with the dropper-shaft; Fig. 3ª, a detail sectional view of the upper part of the grain-delivery spout, showing the operating-shaft, valve-stem, operating-wheel, and clutch for engaging therewith and with said shaft; Fig. 4, a vertical sectional view through a boot or grain-discharge spout and showing the manner in which the valve in the boot is operated; Fig. 4ª, a detail sectional view of the upper end of the grain-delivery spout and showing the means for holding the valve-stem out of engagement with its operating-wheel; Fig. 5, a vertical sectional view through one of the grain-hoppers and showing the manner in which the dropper-plates are attached to the bottom of said hoppers; Fig. 6, a plan view of one of the hoppers with the cover removed; Fig. 6ª, a detail sectional view of the interchangeable dropper-plate; Fig. 7, a detail view showing a dropper-plate and the operating-gear ring to which said plate is attached; Fig. 8, an inverted plan view of the hopper with the dropper-plates and operating-gear connected therewith; Fig. 9, an inverted plan view of the auxiliary dropper-plate; Fig. 10, an edge view of the same; Fig. 11, a detail sectional view showing one of the disk-bearings; Fig 12, a detail view of the lower dropper-plate; Fig. 13, a detail view of a pair of furrowing-disks, together with the dropper-boot, attached to a portion of the frame structure; Fig. 14, a similar view to Fig. 13, but showing one of the disks removed to illustrate the relative position of the bearings for the respective disks; Fig. 15, a detail plan view of one of the scrapers for cleaning the disks; Fig. 16, a detail perspective view of what is shown in Fig. 15; Fig. 17, a plan view of the check-row attachment; Fig. 18, a side elevation of the same; Fig. 19, an end view of the same, showing the manner in which the supporting-bar is hinged and the holding-lever for retaining such supporting-bar in its normal position; Fig. 20, a side view showing the dropper or operating shaft, operating-wheel, operating-pawl, and stop-finger for engaging with said wheel; Fig. 21, a side view showing a portion of the pawl for operating the dropper-shaft driving-wheel and the pivoted arm to which said pawl is connected in section to facilitate illustrating the spring for engaging the pawl to normally hold it in engagement with said operating-wheel; Fig. 22, a plan view of what is shown in Fig. 20. Fig. 23 shows a front elevation of a hand device for engaging with an operating-wheel on the dropper-shaft; Fig. 24, a side elevation of the same; and Fig. 25, a detail view showing another form of lever mechanism for operating the dropper-shaft, to be used in place of a hand dropper attachment.

The letter A represents a pair of driving and supporting wheels mounted on a main axle B. This axle carries a frame structure C, upon which is mounted the usual seat D. The usual driving sprocket-chain E is provided, which is adapted to work upon a nest of gears F, carried by the main shaft B, and also over a sprocket-wheel F', carried by an operating or dropper shaft F'' and adjustable thereon in any suitable manner. Clutch mechanism, such as shown at G, is provided for engaging with and disengaging from the nest of gears. When this clutch mechanism is engaged with the nest of gears, the machine is in condition for drilling grain, as the dropper-shaft will operate continuously in a manner well known. When it is desired to plant in hills, the clutch mechanism G is disengaged from the nest of gears and the dropper-shaft is operated either by a check-row wire or by a hand-lever or foot-lever, as will hereinafter be described.

To the forward end of the frame C are attached supporting-arms H, which act to support the front or runner frame I, carrying the dropper mechanism, as also the dropper-shaft.

In front of each of the driving-wheels A there is mounted on the frame I a grain-hopper J, preferably hinged, as shown at K, so that it may be thrown forward in order that the dropper-plates may be quickly changed to permit the machine to be used for hilling and also for drilling. The dropper-shaft F'' extends underneath each of the hoppers and has mounted upon it a pair of pinions L, which are adapted to mesh with a gear-ring M, supported by an auxiliary dropper-plate P, mounted upon a stud N, projecting downward from the hopper-bottom O. This annular ring is held in place by means of a primary dropper-plate Q, which is also mounted upon the stud N and which has lugs R projecting into notches S in the annular gear M.

The letter T represents a lower supporting-plate, which is fixedly mounted upon the stud N, such stud having its lower end so shaped that the plate T will fit snugly thereon and yet at the same time cannot turn thereon, as illustrated at U in Fig. 12. This plate has a hole or opening V therein, as also a lug W projecting below its lower surface. The lug is for the purpose of fitting into a notch X in the upper surface of the grain-delivery spout Y. (See Figs. 13 and 14.) When the hopper is in its normal position for discharging the grain into the delivery spout or boot, this lug projects within such notch, and consequently the plate is held firmly in position in addition to its being held upon the stud N. Immediately above this plate T is mounted the auxiliary dropper-plate P, such latter plate having a pair of studs Z extending downward therefrom, which are adapted to fit into holes 2 in the supporting-plate T. This auxiliary dropper-plate and the supporting-plate T are substantially the same shape and each have one discharge-opening therein, as illustrated in Figs. 5, 9, and 12 at V and 3, respectively. The primary dropper-plate Q is provided with a series of holes 4, as shown in Figs. 6 and 7 particularly. These latter holes receive the grain through the annular opening 5 in the hopper-bottom O. The grain is held from dropping out of such holes by the auxiliary dropper-plate P until the respective holes 4 match with the passage 3 in the auxiliary dropper-plate and also the passage in the supporting-plate T. This permits the grain to pass out of such holes in the primary dropper-plate one at a time, and by regulating the movement of said plate the machine will either plant the grain in hills or sow it along in furrows. In planting in hills, however, the auxiliary dropper-plate is discarded and a primary dropper-plate of the same exterior form as the primary and auxiliary dropper-plates taken together is employed, the only difference being that the holes in such plate for receiving the grain extend through to the supporting-plate T, as seen in Fig. 6ª at a'. Thus a larger number of kernels of grain may pass into each of the holes in the primary dropper-plate at a time, so that the right number of grains may be dropped in each hill; but in drilling a large number of kernels at a time is not required, as one or two may answer the purpose as long as the primary dropper-plate is given the requisite speed. A washer 6 fits against the lower supporting-plate T and is held in place by a stud-bolt 8, extending down from the base and which projects through said washer and carries at its lower end a nut 7. It will be observed that the stud N has a shoulder 9, against which the supporting-plate T fits. Thus when the nut 7 is tightened against the washer 6 the lower supporting-plate T is tightened against the shoulder 9, so that such plate is non-rotatable, as above stated, yet at the same time will not bind against the primary and auxiliary dropper-plates.

Referring now to the check-row mechanism for causing the dropper-shaft to rotate at intervals, it will be observed that upon the forward frame structure I and at the outer side of the grain-hoppers is mounted one of our improved check-row mechanisms, which we will now describe.

By referring to Fig. 17 it will be seen that our dropper mechanism consists of a frame 10, adapted to be bolted or otherwise secured to the frame structure I, as indicated in Fig. 1. To this frame structure is hinged a pair of pulleys 11 by means of a cross-bar 12. This cross-bar carries each of the pulleys upon a bolt or stud 13, projecting through the cross-bar 12 in such a position that the pulleys stand adjacent to the respective side plates 14, carried by the frame structure 10. From Fig. 19 it will be observed that the cross-bar has a lug 15, (one at each end,) extending upward from the horizontal portion 16, it being understood that such cross-bar consists of horizontal portions and upright portions 16 and 17, respectively. Lugs 18 (a pair, one at each end) project downward from the frame structure 10, and through the lugs 15 and lugs 18 extends a rod 19, such rod permitting the cross-bar to swing down about it, thereby carrying the pulleys or sheaves 11 away from the plates 14. In order to hold the pulleys up against the plates 14, thereby holding the pulleys in their proper position, it will be seen that a trip-lever 20, pivoted upon a bolt 21, carried by the frame structure 10, is adapted to engage with the horizontal bar or base portion 16 of the supporting-bar in such a manner that it prevents such supporting-bar from swinging about its axis. This trip-lever normally rests upon such supporting-bar, in which position it is held by a spring 22, which engages with an arm 23, extending from said trip-lever, such spring also engaging at its other end with a check-row-operating lever 24, mounted upon a bolt 25, which extends through the frame structure 10. A rope or other flexible connection 26 is attached to the outer end of the trip-arm 20, so as to permit the driver to swing said trip-arm around its pivot 21, and thereby disengage said trip-arm from the base 16 of the supporting-bar, so that said supporting-bar may be swung down about its pivot and thereby release the check-row wire. Rollers $a$ are carried by each of the plates 14 at a sufficient distance above the pulleys 11 to permit the wire and its enlargements to pass, while at the same time preventing the wire from jumping out of the pulleys.

We will now refer to the manner in which the dropper-shaft is caused to rotate by means of the check-row wire.

By referring to Figs. 17, 18, and 19 it will be observed that the wire which passes across the pulleys 11 will pass through the fork 27. As a knot on the check-row wire (not shown) comes in contact with the fork 27 it moves the fork about its pivot 25 into such a position that the knot will slip past the fork. This will cause the rod 28, which projects within a pawl 29, as shown in Fig. 20, to operate such pawl into engagement with one of a number of pins 30, carried by a wheel 31, fixedly mounted upon the dropper-shaft F''', and partially rotate such wheel until the pawl and rock-arm 32 occupy the dotted position, as indicated in Fig. 20. It will be observed that the pawl has a forward extension 33, which fits on top of the pins 30, while the portion which comes in contact with the pins, as shown at 34, is slightly curved outward, so that after the pawl once engages with the pins it will not become disengaged therefrom. In order that the forward extension 33 may be brought into contact with the pins, we provide a spring 35, mounted in a recess 36 in the rock-arm 32. This spring is mounted back of the pivot 37, so that it acts upward on one end of the pawl and downward on the end engaging with the pins. In this way the pawl is prevented from becoming displaced with the sudden backward-and-forward motion. The rock-arm 32 has a finger 38 projecting therefrom which when the rock-arm is in its full-line position stands outside of the wheel 31; but as soon as the rock-arm is moved to its extreme inner limit, as shown in dotted lines in Fig. 20, such finger is in engagement with one of the pins 30. This prevents the wheel from turning too far. The dropper-plates are arranged with respect to this operating movement of the rock-shaft and pawl so that the outlet-opening in the lower dropper-plate is in line with the hole in the auxiliary dropper-plate and also with one of the holes in the primary dropper-plate in order that the grain may readily drop through into the boot, hereinafter described. Thus the overthrow of the dropper-shaft, as also the primary dropper-plate and auxiliary dropper-plate, is guarded against.

We will now refer to the means for operating the dropper-shaft by hand or by the foot, it being understood that in such cases the check-row wire is not used.

Referring to Figs. 23 and 24, it will be observed that upon the forward frame structure I is mounted an upright standard 39, bolted or otherwise secured to the frame structure. The dropper-shaft F''' passes through the standard and has mounted thereon a wheel 40, similar to the wheel 31. This wheel is fixed to the shaft in any suitable manner and carries pins 41. Above the wheel and supported within the standard is mounted a pair of pawls 42 and 43, respectively, which are pivoted to a sliding block 44, carrying pins 45, to which the pawls are directly pivoted. A spring 46 is secured to each of these pawls below their pivotal point and between them, such pawls being directly opposite each other and sufficiently separated from each other to span the wheel 41. A lug 47 extends out to one side of the standard and acts as a support for a hand-lever 48, which is pivotally connected therewith. This hand-lever has a slotted extension or finger 49. A bolt 50 extends through the sliding block 44 and also through the slot in said extension. By taking hold of the upper end of the lever 48 and throwing such lever away from the frame structure it causes the block 44, together with the pivoted pawls 42, to be elevated, since the extension 49 curves downward and away from the hand-lever. As soon as the pawls are elevated the pawl 42 engages with one of the pins 41 and acts to partially rotate the wheel 40 into such a position that the pawl 43 will engage with another of the pins 41 of said wheel ready for a return stroke of the pawls. By throwing the lever backward to the position it occupies in Fig. 23 it will cause the pawls to descend together, the pawl 43 at the same time acting upon the wheel 40, so that such wheel is again partially rotated, as also the dropper-shaft upon which the wheel is rigidly mounted, while the pawl 42 will ride over another of the pins 41 and will fall in behind it by reason of the spring 46 acting thereon and will be again in position to partially rotate the wheel 40 on again moving the lever 48 outward from the standard 39.

In some instances it is desirable to operate the dropper-shaft by foot-power, and to this end the standard 39 is made removable and may be detached from the machine, there being substituted therefor a clip 52, which is adapted to be secured to the frame I by means of a bolt 53 and which has pivoted to it a lever 51. A rod 54 connects with the lower end of the lever 51 and also with a foot-lever 55, as shown in Fig. 1. A pivoted pawl 56 is pivoted to the upper end of the lever 51 and has a forward extension 57, similar to the extension 33, as illustrated in Fig. 20. This pawl is held in engagement with one of the pins 41 in any suitable manner. Thus by the use of the same driving-wheel on the dropper-shaft we are enabled to use both a hand-dropper and a foot-dropper, such foot-dropper being in convenient position for a single operator to work the machine, while where a hand-lever is used more than one person is required.

Referring now to the boot or delivery-spout, as shown in Fig. 4, it will be observed that we provide a four-cornered drive-wheel 58, which has its points rounded to constitute a curved irregular outer periphery for engaging with a lever or valve-stem 59, pivoted at 60 within the feed-spout and constituting a valve-stem, it being understood that at its lower end it engages with a valve 61, as shown in section in Fig. 4. The boot is provided with an offset or table 62, upon which the grain drops through the open upper end of the valve 61 and between the valve-stem 59 and the casing. As the valve-stem is operated upon by the operating-wheel 58 it will rock the valve 61 from its position shown in Fig. 4 to discharge position. This will cause the grain to be thrown immediately over the lower open end of the boot, and the direction of movement of the grain is opposite to the direction of movement of the machine across the field, so that the grain drops straight down instead of backward or forward of the hill. This is very important in planting the grain in hills, as it causes it to drop in exactly the right place instead of carrying it too far forward. This feature, however, in itself is old; but the operating-wheel for causing the valve-stem 59 to operate is, so far as we are aware, a new construction or device. In order that the wheel 58 may be rotated, we provide a clutch-sleeve 78, which fits upon the dropper-shaft F'''. This clutch-sleeve has projections 79 in the nature of clutches, which extend through the side of the boot or discharge-spout and project into a notch 80 in one side of the wheel 58, as clearly shown in Fig. 3ª. The clutch-sleeve is held in place by means of a cotter-pin 81, which extends through such sleeve and also through the shaft upon which it is mounted. In drilling the grain the valve is held open by any suitable means, such as a set-screw $a'$, which screws against a flange $b'$, projecting from one side of the valve-stem 59. Before tightening the set-screw, however, the upper end of the valve-stem is disengaged from the operating-wheel 58. After the set-screw is tightened upon the flange $b'$ it is held from unscrewing by a jam-nut $c'$. (See Fig. 4ª.) This will permit the grain in the boot to fall directly into the furrow.

Referring now to the furrow-opening disks and the manner in which such disks are mounted, it will be observed that near the lower end of the boot projects a bracket 63, which carries a pair of bolts 64, mounted one above the other, as shown in Fig. 14. These bolts each have heads similar to a stove-bolt, as shown in Fig. 11. A sleeve 65 is mounted on each of these bolts, and upon this sleeve is mounted the hub 66, secured to one of the disks 67 by means of rivets 68, as shown in Fig. 11. This hub projects slightly through the disk and flush with its convex side. Upon the hub and bolt is mounted a scraper 69, which extends within a flange 70, projecting from said hub. The sleeve 65 extends outward from the bracket or support 63 slightly beyond the hub 66. Against this sleeve fits the scraper 69, so that by turning the nut 71 up against the scraper it is bound tightly to the sleeve 65, such sleeve being also held in place between the bracket and scraper, so that it will not turn, and consequently the scraper will also remain fixed. This scraper extends out along the side of its disk, as shown in Fig. 13. An oil-hole 72 is provided in the scraper where it fits over the hub. This oil-hole is closed by means of a screw 73. Thus with our construction we provide a bearing which is exceptionally free from filling with dirt and grit and one which will permit the disk to freely rotate. The portion of the scraper extending out along the disk is provided with a pair of elongated holes 75. A steel plate 76 is bolted to this portion of the scraper and is slightly adjustable in the elongated holes 75. Thus when the scraper wears away it may be pressed closer against the disk by loosening the bolts 77.

It will be noted that the two disks are of different sizes and stand at an angle to each other, such that the edge of the smaller disk at a point below and in front of its axis lies against the face of the larger disk, so that the larger disk cuts in advance and trash or solid is not permitted to enter between the forward edges of the two disks. It will also be noted that the bearings of the two disks are located at different heights, that of the smaller disk being lower than that of the larger disk, so that the lower edges of the two disks are in substantially the same plane, thereby producing a furrow of uniform cross-section.

In order that the disks may be elevated from the soil, we provide the usual organization—namely, a lever H', operating on a rock-shaft $a''$, carrying an arm $b''$, to which is connected one end of a spring-link $c''$. The other end of said link is connected to a bracket $d''$, bolted or otherwise secured to the inner end of the tongue $e''$, as indicated at $f''$. As the lever H' is thrown backward it causes the arm $b''$ to raise the rear end of the tongue and through the frame I the disks, the frame I and main frame being pivotally connected for this purpose. The tongue is held in such position by reason of the detent $g''$ engaging with the toothed segment $h''$, formed at the upper end of the bracket $z''$.

Having thus fully described our invention, what we claim as new, and desire to secure by Letters Patent, is—

1. In a corn-planter, the combination with a check-row-wire frame having a check-row lever pivotally and horizontally mounted thereon and operated in one direction by a check-row wire, a pulley-supporting bar hinged to said frame, a pair of pulleys carried by said bar for carrying a check-row wire for engaging with said check-row lever, a pivoted lever also carried by said frame structure for holding said supporting-bar in position for said pulleys to engage with said wire, and a spring engaging with said holding-lever and with said check-row lever to normally hold the holding-lever in engagement with said supporting-bar and return said check-row lever after being operated by the check-row wire, all substantially as shown and described.

2. In a corn-planter, the combination with a check-row-wire frame carrying a pair of plates, a supporting-bar hinged to said frame, a pair of pulleys carried by said supporting-bar and adapted to normally stand adjacent to said plates, a holding-lever for normally engaging with said supporting-bar to hold said pulleys in normal position, a check-row lever pivoted upon said frame and projecting between said pulleys in a horizontal direction to receive a check-row wire passing through the pulleys, whereby such check-row lever is operated in one direction, a spring for engaging with said check-row lever and with said holding-lever to return said check-row lever after being operated upon by said check-row wire and to retain said holding-lever in holding position with respect to said supporting-bar, all substantially as shown and described.

3. In a corn-planter, the combination with a check-row-wire frame carrying a pair of plates, a roller carried by each of said plates, a supporting-bar hinged to said frame structure, a pair of pulleys carried by said supporting-bar and normally standing adjacent to said plates and said rollers, a holding-lever engaging with said supporting-bar to hold said pulleys in check-row wire-holding position, an arm projecting from said holding-lever, a check-row lever pivotally and horizontally supported upon said frame and projecting between said pulleys, and movable in one direction by a check-row wire, a spring secured to said check-row lever and to the arm on said holding-lever for returning said check-row lever and for normally holding said holding-lever in holding position, and means to release said holding-lever whereby said supporting-bar is permitted to remove the pulleys from said plates and rollers so that the check-row wire may be removed or inserted, all substantially as shown and described.

4. In a corn-planter, the combination, with a dropper-shaft, of a wheel thereon having laterally-projecting pins, a pawl adapted to engage said pins to actuate the dropper-shaft, a rocker-arm pivotally connected with a fixed portion of the frame at one end and similarly connected to the pawl at its other end, said rocker-arm being provided with a projecting stop-arm to successively engage the pins, a check-row lever, and a link connecting said check-row lever with the rock-arm, substantially as described.

5. In a corn-planter, the combination with a grain-hopper, of a base having a stud projecting downward therefrom and integral therewith and also having an opening in said base, a primary dropper-plate pivotally mounted on said stud, having grain-openings therein, one or more lugs extending from the periphery of said plate, an annular driving-ring within which said dropper-plate fits and with which said lugs engage, a supporting-plate mounted beneath said dropper-plate and engaging therewith, as also with said annular ring to support them, said supporting-plate having a grain-discharge opening therein adapted to match with the grain-openings in said dropper-plate, and means for holding said plates in position, all substantially as shown and described.

6. In a corn-planter, the combination with a grain-hopper having a bottom with a grain-discharge opening therein, a hollow stud projecting downward from said base and integral therewith, said stud having a shoulder thereon, a stud-bolt also projecting downward from said bottom through and below said stud-shaft, a dropper-plate rotatably mounted on said stud-shaft, a holding-plate also mounted on said stud-shaft and against said shoulder, a washer fitting on said stud-bolt and secured against the bottom of said holding-plate, said dropper-plate having a series of holes therein for receiving grain from said hopper and said holding-plate also having a hole therein with which the holes in said dropper-plate match, one at a time, and means for rotating said dropper-plate, all substantially as shown and described.

7. In a corn-planter, the combination with a grain-hopper, having an annular opening in its bottom, a stud-shaft projecting downward from said bottom and integral therewith, a primary dropper-plate rotatably mounted on said stud, an auxiliary dropper-plate also mounted on said stud-shaft below said primary dropper-plate, an annular driving-ring about said primary dropper-plate having notches in its inner periphery, lugs extending from the outer periphery of said primary dropper-plate for engaging with said notches, said annular driving-ring being operated by said auxiliary dropper-plate, a shoulder on said stud, a stationary supporting-plate mounted upon said stud and against said shoulder and beneath said auxiliary dropper-plate, and means projecting from said auxiliary dropper-plate to engage with said stationary holding-plate, and means for holding the stationary supporting-plate and the main and auxiliary dropping-plates in operative position upon said stud, all substantially as shown and described.

8. In a corn-planter, the combination with a delivery-spout having a notch in its upper end, of a grain-hopper mounted upon the upper end of said discharge-spout, a stationary supporting-plate carried by said hopper, a lug projecting downward from said plate for engaging with the notch in said delivery-spout or boot, all substantially as shown and described.

9. In a corn-planter, the combination with a grain-hopper, of a stud-shaft projecting downward from the bottom thereof, a primary dropper-plate, an auxiliary dropper-plate and a supporting-plate mounted on said stud-shaft, said primary dropper-plate having a series of holes therein adapted to receive grain from said grain-hopper, said auxiliary dropper-plate and said supporting-plate each having a hole therein adapted to match with each other and also in position to match with the holes in said primary dropper-plate, lugs projecting downward from said auxiliary dropper-plate into said stationary supporting-plate, and means for holding each of said plates upon said stud-shaft, all substantially as shown and described.

10. In a grain-hopper, the combination with a boot or discharge-spout, of a bracket projecting therefrom and having holes therein, one above the other, of a pair of trunnions extending in opposite directions from said bracket and at an angle to said bracket, a pair of furrowing-disks mounted on said respective trunnions, one slightly back of the other, and having their lower edges in the same horizontal plane, all substantially as shown and described.

11. In a corn-planter, the combination with a delivery-spout or boot, a bearing having a through-bolt extending from said spout, a sleeve loosely mounted thereon, a hub mounted on said sleeve and shorter than the sleeve, a disk secured about said hub, a scraper having a cup at one end for fitting over said hub, and means for binding said scraper against said sleeve, all substantially as shown and described.

12. In a disk-bearing for corn-planters, the combination with a disk, of a hub having a flange thereon adapted to extend into said disk and have its flange abut against said disk, rivets for securing said disk to said hub, a sleeve adapted to fit within said hub and longer than said hub, a bolt extending from a support and through said sleeve, a scraper, a cup formed on one end of said scraper and adapted to fit over said bolt and on said hub, and a nut on the bolt for binding said cup against said sleeve, and a screw-plug extending through said cup and adapted to be removed for oiling the bearing, all substantially as shown and described.

13. In a bearing for a grain-drill furrowing-disk, the combination with a disk proper, of a hub having a flange thereon and adapted to extend through said disk and have its flange fit against said disk, an annular flange projecting outward from said flange, a sleeve mounted within said hub, a through-bolt engaging with a stationary body and extending through and beyond said sleeve, a scraper formed into a cup at one end, a scraper-plate adjustably mounted thereon, said cup fitting over said hub and under said second-named annular flange, a nut adapted to screw upon said through-bolt to snugly draw the cup against said sleeve, whereby the scraper will remain in a fixed position, said cup having an oil-passage therein for oiling said bearing, all substantially as shown and described.

14. In a corn-planter, the combination with a frame structure, of a casing secured thereto, a dropper-shaft projecting through said casing, a sliding block in said casing, a pair of pawls carried by said block, a spring connecting said pawls together, a wheel carried by said shaft, pins carried by said wheel and adapted to be engaged by said pawls, a hand-lever for raising and lowering said block, one of said pawls being adapted to engage with one of said pins when the pawls are raised and the other adapted to engage with one of said pins when the pawls are forced downward, all substantially as shown and described.

15. In a corn-planter, the combination with a frame structure, of a casing secured thereto, a dropper-shaft passing through said casing, an operating-wheel rigidly connected with said shaft and within said casing, pins carried by said operating-wheel, a sliding block carried by said casing, a pair of pawls pivotally connected with said block and adapted to engage with said pins, one at a time, a spring connecting said pawls together for holding them in position to engage with said pins, a lever pivoted to said casing, a curved slotted finger extending from said lever, a bolt adapted to extend through said sliding block and the slot in said finger, said block being raised and lowered by said slotted finger on operating said lever, and one of said pawls acting to rotate said wheel and dropper-shaft, both on raising and lowering said block, all substantially as shown and described.

16. In a corn-planter, the combination with a discharge-spout or boot, of a dropper-shaft extending into said boot, a lever-operating wheel mounted thereon, said operating-wheel having a notch therein at one side thereof, a clutch-sleeve mounted on said dropper-shaft and having lugs or extensions for engaging the notch in said wheel, and a cotter-pin for securing said clutch-sleeve upon the shaft, all substantially as shown and described.

17. In a corn-planter, a furrow-opener consisting of two disks of different diameters arranged at an angle to each other and to the line of draft, the edge of the smaller disk lying against the rear face of the larger disks at a point below and in front of their axes, and the lower edges of the two disks being in substantially the same plane, substantially as described.

In testimony whereof we affix our signatures in presence of two witnesses.

FRANK C. HARWOOD.
GEORGE E. GEDGE.
PHILIP T. J. MONSON.

Witnesses:
B. B. ESTERLINE,
W. M. MCNAIR.